J. E. BASTER.
CANE STRIPPER.
APPLICATION FILED MAR. 1, 1909.
954,159.
Patented Apr. 5, 1910.
3 SHEETS—SHEET 1.
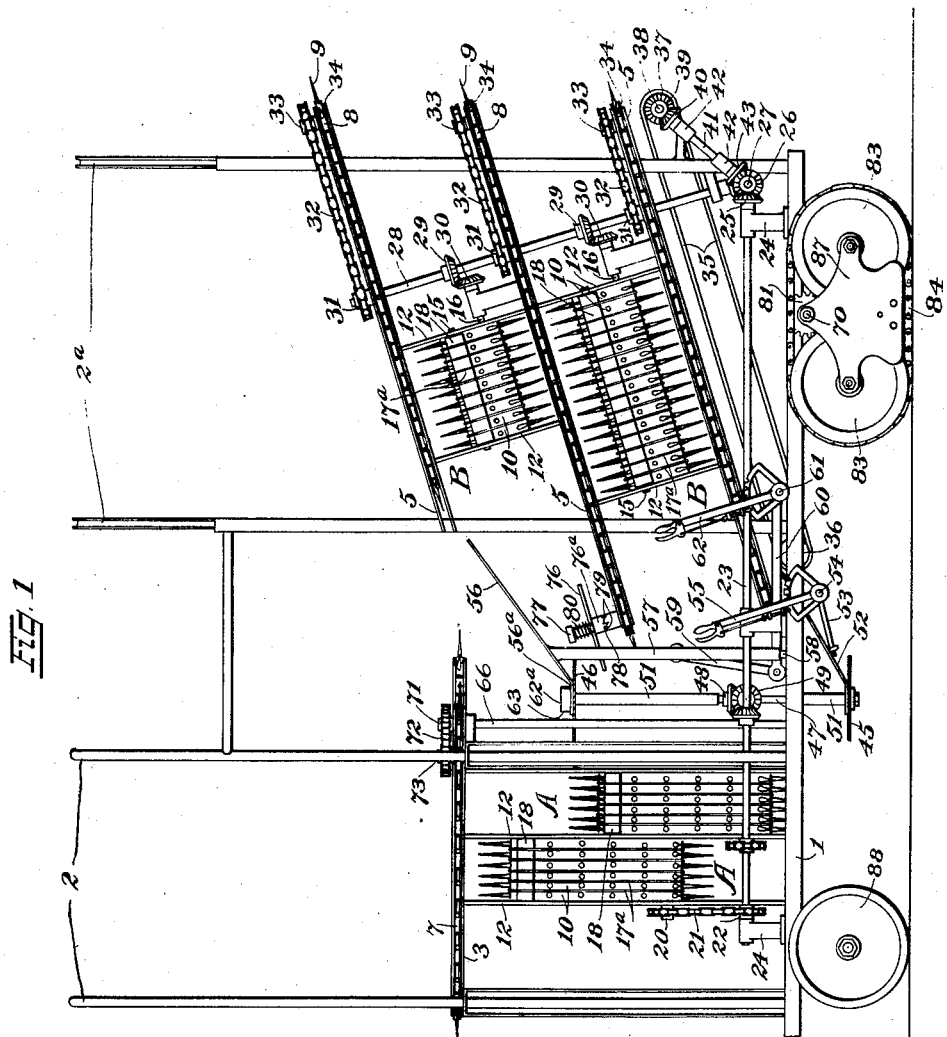
Witnesses:
F. C. Valentine
M. G. Swinehart
Inventor:
Joseph E. Baster
by Obed B. Billman
his attorney.

J. E. BASTER.
CANE STRIPPER.
APPLICATION FILED MAR. 1, 1909.
954,159.
Patented Apr. 5, 1910.
3 SHEETS—SHEET 2
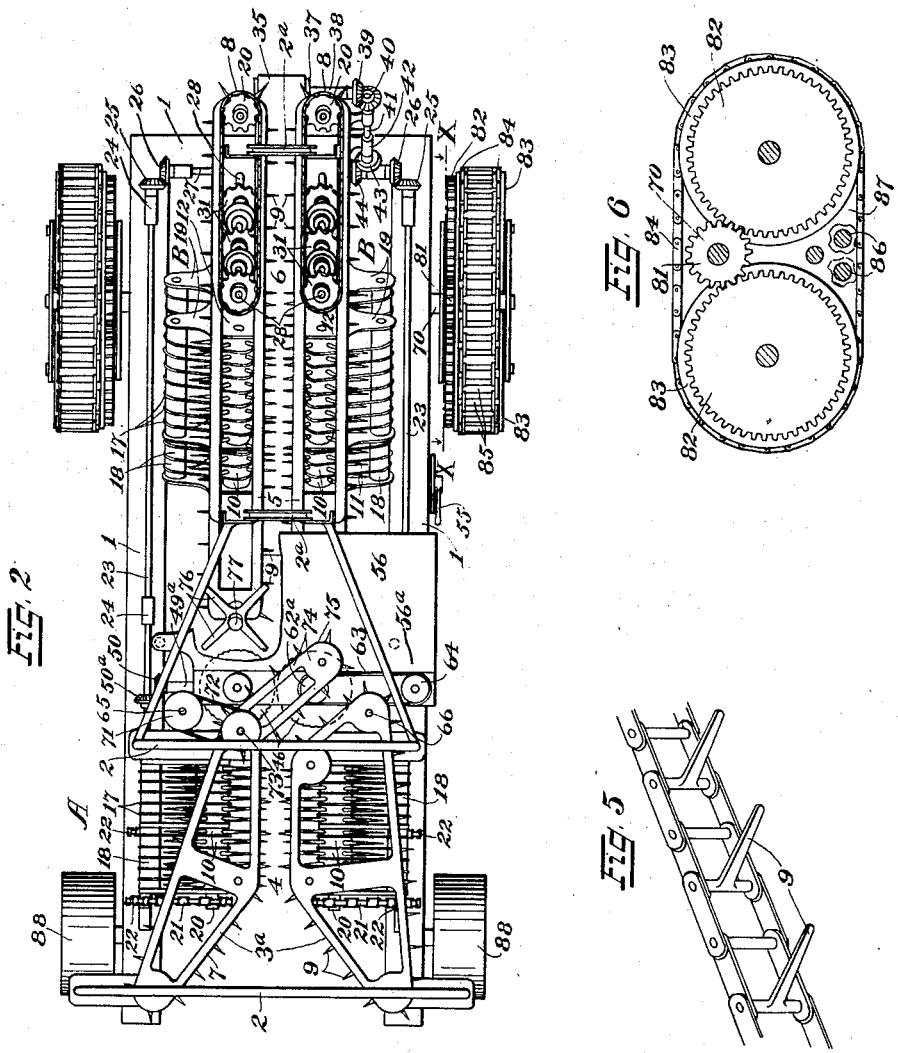
Witnesses:
F. C. Valentine
M. G. Sinnehart
Inventor:
Joseph E. Baster
by Obed C. Billman
his attorney.

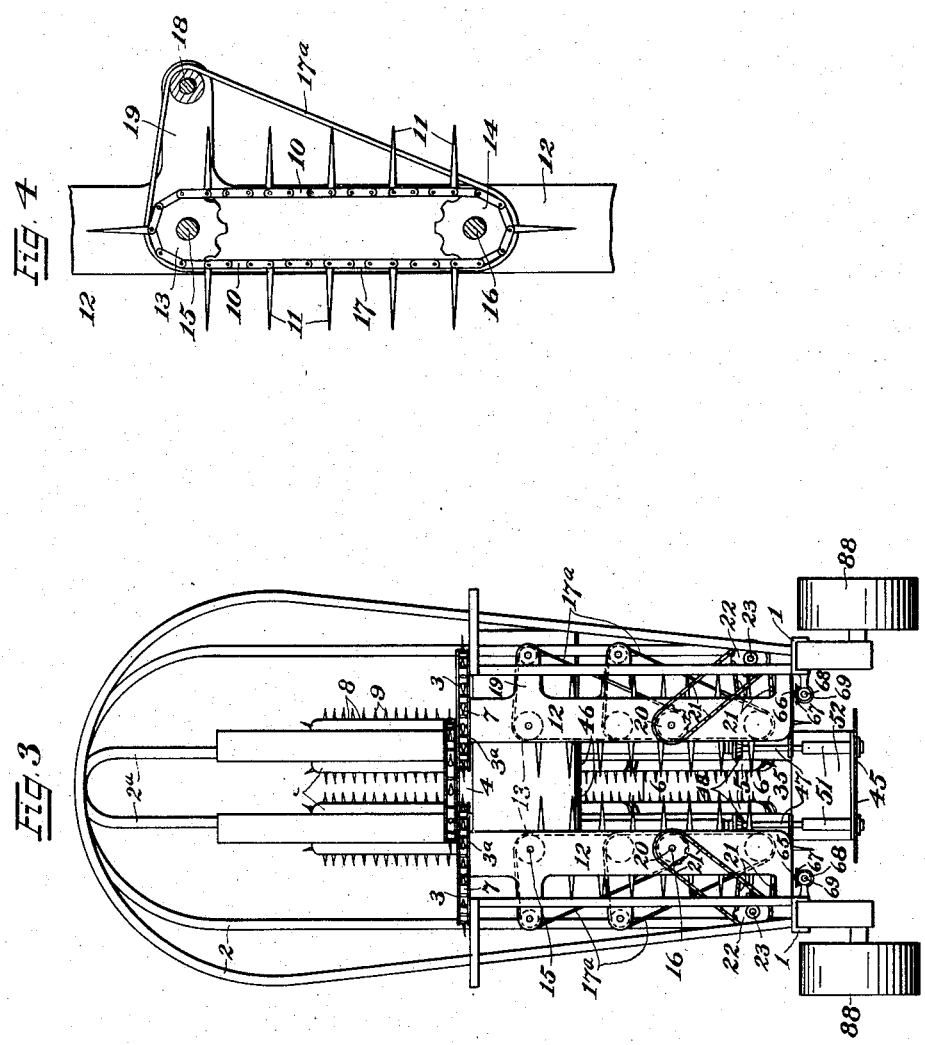

UNITED STATES PATENT OFFICE.

JOSEPH E. BASTER, OF CLEVELAND, OHIO.

CANE-STRIPPER.

954,159.  Specification of Letters Patent.  Patented Apr. 5, 1910.

Application filed March 1, 1909. Serial No. 480,792.

*To all whom it may concern:*

Be it known that I, JOSEPH E. BASTER, a citizen of the United States, residing at Cleveland, in the county of Cuyahoga and State of Ohio, have invented certain new and useful Improvements in Cane-Strippers, of which the following is a specification.

My invention relates to improvements in cane-strippers, the invention being designed to strip and convey sugar-cane in a vertical position to the rear portion of the machine where it may be accumulated in suitable bundles or conveyed into a wagon or cart as desired.

The primary object of the invention is to provide a generally improved stripper for the purposes above mentioned which will be exceedingly simple in construction, cheap of manufacture, and efficient in use.

The invention relates more particularly to improvements in cane stripping mechanism adapted to be operated in conjunction with the cane-stalk conveyer members, said cane stripping mechanism comprising a plurality of vertically-disposed endless stripper members arranged in banks at the sides of the cane-stalk receiving and conveying guide-ways and provided with similarly arranged stripper cleaning members provided with rearwardly-extending arm cleaning portions extending to the rear and at an angle to the line of travel of the return portions of the armed stripper members whereby any accumulated or adhering cane-stalk leaves carried upon the stripper arms of the stripper members will be removed therefrom.

With the above mentioned objects in view, the invention in its present embodiment consists in the novel construction, arrangement, and combination of parts, hereinafter described, illustrated in the accompanying drawings, and particularly pointed out in the appended claims.

Referring to the drawings, forming a part of this specification, Figure 1, is a side elevation of a cane-stripper constructed in accordance with this invention. Fig. 2, a top plan view of the same. Fig. 3, a front elevation of the same. Fig. 4, a vertical sectional view of one of the banks of endless cane stripper members comprised in the cane stripping mechanism. Fig. 5, a detail perspective view of a portion of one of the endless cane stalk conveyer members. Fig. 6, an enlarged detail cross sectional view of one of the improved traction members taken through line $x$—$x$ of Fig. 2.

Similar characters of reference designate like parts throughout all the figures of the drawings.

The carriage or frame of the improved stripper comprises a U-shaped base frame 1, having its open end extending forwardly and carrying a plurality of vertically-disposed arch-shaped members 2, and $2^a$, the arch shaped members 2, at the front portion of the machine carrying a pair of horizontally-extending conveyer guide-members or frames 3, providing an intermediate cane-stalk receiving guide way 4. The arch shaped rear members $2^a$, are provided with a plurality of horizontally-extending conveyer guide-members 5, preferably, upwardly inclined as shown and spaced apart to provide an intermediate cane stalk conveyer guide-way 6.

The conveyer guide members or frames 3, at the front of the machine are provided with rearwardly converging front portions $3^a$, leading to the cane stalk receiving guide-way 4, and endless cane stalk receiving and conveying members 7, operated as hereinafter described.

The conveyer guide members 5, are provided with endless cane stalk conveyer members 8, operated as hereinafter described, said cane stalk conveying members 7, and 8, being armed with stalk engaging arms 9, adapted to engage and convey the cane-stalks in a vertical position throughout the guide-ways 4, and 6.

The cane stripping mechanism comprises a plurality of vertically disposed endless stripper members 10, arranged in banks A and B, at the sides of the guide-ways 4, and 6, at the front and rear portions of the machine said stripper members 10, being armed with stripper-arms 11, adapted to travel vertically and downwardly on each side of the cane-stalks and at right angles to the line of travel of the conveyer members 7, and 8, said stripper arms projecting into the guide-ways 4, and 6, as shown in the drawings. Each bank of endless stripper members comprises a pair of end bearing bars or plates 12, carrying an upper roller 13, and a lower driving roller 14, and the rollers 13, and 14, are mounted on bearing shafts 15, and 16, motion being imparted to the endless stripper members by means of the lower driving rollers 14, on the shafts 16, said shafts 16, being provided with suitable gearing as hereinafter described. As a means for clearing or cleaning the stripper arms 11, of any cane leaves which may cling thereto, a plurality of endless stripper cleaner members 17, are interposed between the stripper arms 11, of the endless stripper members 10, and are extended rearwardly to form angled stripper arm cleaning portions 17$^a$, extending to the rear and at an angle to the line of travel of the return portions of said armed stripper members. In the present instance, said stripper cleaner members consist of endless cable members carried upon and moving with the rollers 13, and 14, the rearwardly extending angled cleaning portion 17$^a$, being formed by means of an idle roller 18, carried by and interposed between rearwardly extending bearing arms 19, of the main end bearing plates 12. The endless stripper members 10, comprised in the front banks A, are adapted to act upon the cane stalks before being severed and topped by the mechanism hereinafter described, the stripper members comprised in said banks being operated by means of sprocket wheels 20, on the driving shafts 16, said sprocket wheels being provided with sprocket chains 21, passing over sprocket wheels 22, carried upon longitudinally-extending driving shafts 23, mounted in bearings 24, carried by the side members of the U-shaped frame 1. The driving shafts 23, are provided at their rear ends with beveled gears 25, meshing with bevel gears 26, carried upon a transversely disposed driving shaft 27, at the rear of the machine, said driving shaft being connected to and driven by any suitable and convenient source of power.

As a means of imparting motion to the cane stalk conveyer members 8, and endless stripper members 10, comprised in the rear banks B, a pair of driving shafts 28, are mounted at the sides of the cane stalk conveyer guide-way 6, and geared at their lower ends to the main driving shaft 27. The driving shafts 28, are provided with beveled gears 29, meshing with beveled gears 30, carried upon the ends of the driving shafts 16, of the banks B, and said driving shafts 28, are also provided with sprocket wheels 31, carrying sprocket chains 32, passing over sprocket wheels 33. The sprocket wheels 33, are mounted on driving shafts provided with sprocket wheels 34, carrying the rear ends of the cane-stalk conveyer members 8. An endless stalk-supporting conveyer-member 35, is mounted beneath the guide-way 6, and carried upon an idle roller 36, at its front and a driving roller 37, at its rear. The driving roller 37, is driven by means of a driving shaft 38, carrying a bevel gear 39, meshing with a bevel gear 40, on an inclined driving shaft 41. The inclined driving shaft 41, is mounted in suitable bearings 42, at the rear of the machine and is provided with a second bevel gear 43, meshing with a bevel gear 44, on the main driving shaft 27.

The cane stalk severing and topping mechanism comprises a pair of cane severing disks or saws 45, and a pair of cane topping disks or saws 46. The cane severing and topping disks or saws are mounted at the rear of the cane receiving guide way 4, and are vertically adjustable upon a pair of vertical disk or saw driving shafts 47. The driving shafts 47, are provided with bevel gears 48, meshing with bevel gears 49, on transversely disposed driving shafts 49$^a$. The driving shafts 49$^a$, are provided at their ends with bevel gears 50, meshing with bevel gears 50$^a$, on the driving shafts 23.

The cane severing and topping disks 45, and 46, are carried upon the ends of tubular shafts 51, keyed upon the driving shafts 47, in a well known manner for permitting vertical or longitudinal movement or adjustments upon the driving shafts 47, the cane severing disks or saws 45, being suspended and capable of vertical adjustment by means of an inclined movable plate 52, leading to the front end of the stalk supporting conveyer member 35, said inclined plate being adapted to be raised or lowered by means of an arm 53, attached to a rock shaft 54, adapted to be oscillated by means of a lever 55.

The cane topping disks or saws 46, are suspended and capable of vertical adjustment by means of an inclined cane top receiving plate 56, carried upon tubular guide arms 57, slidably mounted upon guide stems 58. The tubular guide arms 57, are capable of vertical adjustment by being connected to a connecting arm 59, pivotally connected to and carried upon the free end of the crank arm 60, said crank arm being carried by rock shaft 61, provided with a lever 62. One of the tubular shafts carrying one of the topping disks 46, is provided with a pulley 62$^a$, carrying a belting 63, extending over an idle pulley 64. The belting 63, is adapted to carry away the tops of the cane stalks as they fall into the channel portion 56$^a$, of the cane top receiving plate 56.

The cane stalk receiving and conveying members 7, are driven by means of vertical driving shafts 65, and 66, provided at their lower ends (see Fig. 3) with bevel gears 67, meshing with bevel gears 68, on a second pair of longitudinally-extending driving shafts 69. The driving shafts 69, are suitably geared at their rear ends to the main driving shaft 70, for propelling the machine as hereinafter described. The vertical driving shaft 65, is provided with a sprocket wheel 71, carrying a sprocket chain 72, mounted upon the shaft 73, said shaft 73, being provided with a sprocket wheel carrying the rear portion of the adjacent cane stalk receiving and conveying member 7. As a means for carrying the severed tops to the cane topping receiving plate 56, a rearwardly and laterally extending guide member frame 74, is provided said guide member frame 74, being provided with an armed cane top receiving and conveying member 75, passing over a sprocket wheel on the shaft 73, and being driven in a manner similar to the cane stalk receiving and driving members 7.

The topped and severed cane stalks are prevented from falling forward and are assisted in being carried in a vertical position to the front portion of the cane stalk conveyer guide way 6, by means of a plurality of horizontally revolving cane stalk engaging arms 76, carried upon revoluble shafts 77, said shafts being revolved by means of sprocket wheels carrying the front ends of the adjacent cane stalk conveyer members 8. As a means for preventing the engaging arms 76, from retarding the entrance of the vertically-disposed cane stalks into the guide-ways 6, the hub portion 76$^a$, is provided with inclined interlocking teeth 78, normally engaged by similarly shaped teeth 79, on the shaft 77, said hub portion 76$^a$, being normally held in interlocking engagement with the shaft 77, by means of a coiled spring 80, it being evident that by reason of this construction should the cane stalks be carried into the guide ways 6, faster than the revolution of the arms 76, that the inclined portions of the teeth 78, and 79, will cause the hub portion 76$^a$, to be elevated against the resistance of the spring A, and the cane stalk engaging arms 76, will be revolved so as not to retard the entrance of the cane stalks into the conveyer guide-way 6.

The main driving or axle shaft 70, may be operated by any suitable and convenient source of power and is provided at each side with a pinion wheel 81, meshing with gear wheels 82, carried upon the inner sides of a pair of traction wheels 83. As a means for providing for an increased traction or bearing surface an endless traction member is mounted upon the traction wheels 83, said endless traction member, preferably, comprising a pair of sprocket chains 84. The links of the sprocket chains 84, are preferably provided with cross bearing strips or bars 85, and as a means for preventing any sagging of the traction member intermediate the tread portions of the traction wheels 83, a pair of friction rollers 86, are mounted in the bearing plates 87, carrying the axles of the traction wheels, said friction rollers being adapted to be engaged by the inner sides of the sprocket chains 84, of the traction members as shown most clearly in Fig. 6, of the drawings.

The front bearing wheels 88, of the carriage may be mounted in any suitable and convenient manner and guided in any manner deemed most appropriate for the purposes of this invention.

Having thus described my invention, what I claim and desire to secure by Letters Patent is,—

1. In a cane-stripper, the combination with a bank of armed stripper members; of a plurality of cleaner members interposed between said armed stripper members and provided with rearwardly extending arm cleaning portions extending to the rear and at an angle to the line of travel of the return portions of said armed stripper members.

2. In a cane-stripper, the combination with a plurality of stalk conveyer members; of a plurality of stripper members traveling at right angles to the line of travel of said stalk conveyer members and so disposed relative to said stalk conveyer members as to operate upon the cane supported by the latter.

3. In a cane-stripper, a plurality of stripper members arranged in a bank and armed with stripper-arms, and a plurality of intermediate cleaner members having angled rear portions extending between and to the rear of the returning stripper-arms.

4. A cane-stalk stripper, comprising a guide-way, a stalk-supporting conveyer-member beneath said guide-way, conveyer members provided with stalk-engaging arms projecting therein from each side of said guide-way, stripper members provided with stripper arms extending into said guide-way, and stripper cleaner members interposed between said stripper members and provided with angled rear portions extending between and to the rear of said stripper arms.

5. In a cane stripper, a carriage provided with a cane stalk conveyer guide-way and conveyer guide members, endless cane stalk conveyer members, banks of vertically-disposed cane stripper members at the sides of said cane receiving guide-way, and stripper cleaner members carried between said stripper members and provided with rearwardly-extending portions inclined opposite the direction of travel of the returning portions of said stripper members.

6. In a cane-stripper, a cane-stalk conveyer and stripper comprising a carriage provided with a guide-way, an endless stalk supporting conveyer-member mounted beneath said guide-way, cane stalk conveyer members on each side of said guide-way and armed with stalk-engaging arms projecting therein, endless stripper members on each side of said guide-way, and stripper cleaner members interposed between said stripper members and having their rear sides set at an angle to the line of travel of the rear portions of said stripper members.

7. In a cane-stripper, a carriage comprising a plurality of arch-shaped members carrying a plurality of conveyer guide-members affording an intermediate stalk guide-way, a plurality of endless conveyer members mounted in said conveyer guide-members and provided with stalk-engaging arms extending into said stalk guide-way, a plurality of stripper members provided with stripper arms extending into said stalk guide-way and traveling at right angles to the line of travel of said endless conveyer members, and a stalk-supporting conveyer-member mounted beneath said stalk guide-way.

8. In a cane-stripper, a carriage provided with vertical supporting members, inclined conveyer guide-members carried by said supporting members and spaced apart affording an intermediate stalk guide-way, stalk conveyer members mounted in said guide-members, inclined stripper members mounted intermediate said stalk conveyer members, and stripper cleaner members interposed between said stripper members.

9. In a cane-stripper, a carriage carrying a plurality of stalk conveyer members affording an intermediate stalk guide-way, a stalk-supporting conveyer-member mounted beneath said stalk guide-way, stripper members vertically interposed between said stalk conveyer members, and stripper cleaner members carried between said stripper members and provided with rearwardly extending portions inclined opposite the direction of travel of the returning portions of said stripper members.

10. In a cane stripper, a carriage provided at its front with conveyer guide members, an intermediate cane stalk conveyer guide-way, endless conveyer members carried in said guide members, and a plurality of armed cane stripper members and intermediate stripper cleaner members arranged in banks intermediate said conveyer guide members.

11. In a cane stripper, a carriage carrying a plurality of inclined stalk conveyer members affording an intermediate stalk guide-way, a stalk supporting conveyer member mounted beneath said stalk guide-way, and banks of vertically arranged cane stripper members interposed between said stalk conveyer members.

12. In a cane stripper, the combination with a plurality of stalk conveyer members; of a plurality of banks of endless stripper members interposed between said stalk conveyer members and traveling at right angles to the line of travel of said stalk conveyer members, and a plurality of intermediate cleaner members provided with rearwardly extending portions extending to the rear of the return portions of said endless stripper members.

13. In a cane-stripper, the combination with a plurality of cane conveyer members providing an intermediate stalk guide-way; of a plurality of cane stripper members arranged at the sides of said guide-way and traveling at right angles to said cane conveyer members.

14. In a cane-stripper, a plurality of armed cane stripper members and intermediate stripper cleaner members arranged in a bank, said stripper cleaner members having extended portions set at an angle to the line of travel of the return portions of said armed cane stripper members.

In testimony whereof I have affixed my signature, in presence of two witnesses.

JOSEPH E. BASTER.

Witnesses:
S. H. KLEINMAN,
O. C. BILLMAN.